United States Patent [19]
Bradshaw et al.

[11] 3,844,182
[45] Oct. 29, 1974

[54] RACK AND PINION ASSEMBLIES

[75] Inventors: Kenneth Bradshaw, Yatton; James Ernest Buckingham, Portishead, both of England

[73] Assignee: Cam Gears Limited, Hitchin, Hertfordshire, England

[22] Filed: May 4, 1973

[21] Appl. No.: 357,371

[30] Foreign Application Priority Data
Aug. 22, 1972 Great Britain.................... 39106/72

[52] U.S. Cl..................................... 74/498, 74/422
[51] Int. Cl........................... B62d 1/20, F16h 1/04
[58] Field of Search............................. 74/498, 422

[56] References Cited
UNITED STATES PATENTS
3,630,099  12/1971  Miyoshi ............................... 74/498
3,762,240  10/1973  Adams................................. 74/498

Primary Examiner—Leonard H. Gerin
Attorney, Agent, or Firm—Hill, Gross, Simpson, Van Santen Steadman, Chiara & Simpson

[57] ABSTRACT

Rack and pinion assemblies employ a bearing assembly which is provided for rotatably mounting the pinion member in a housing member, the bearing assembly comprising three generally annular bearing elements which substantially encircle the pinion member. A first of the bearing elements is carried by one of the pinion or housing members and the second and third of the bearing elements are carried in an axially disposed relationship by the other of these members. The first element has a first bearing surface which engages axially between and slidably abuts substantially complementary second and third bearing surfaces of the second and third elements, respectively. The area of abutment between the respective surfaces extends both radially and axially so that the abutment restrains both radial and axial displacement of the first bearing element relative to the other two. The bearing assembly may be mounted in the rack and pinion assembly on a piecemeal basis, or may advantageously be provided as a pre-formed, pre-loaded unit whereby loading adjustments do not depend upon the skill of an operator during assembly of the rack and pinion.

29 Claims, 5 Drawing Figures

PATENTED OCT 29 1974 3,844,182
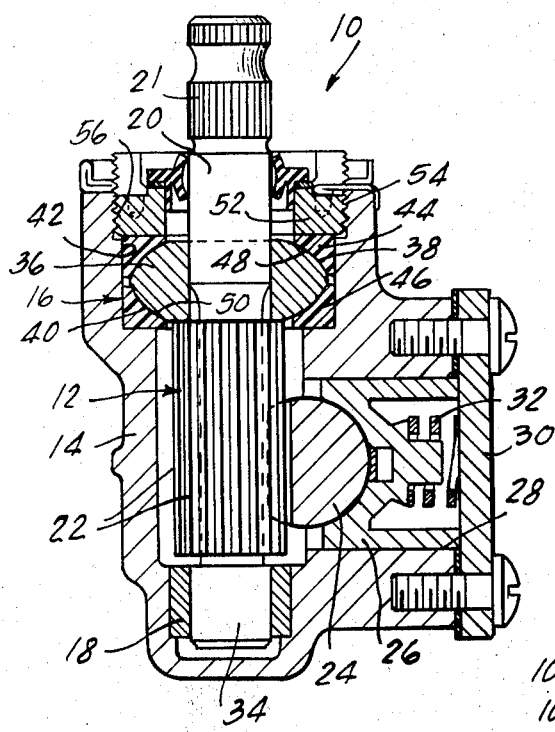
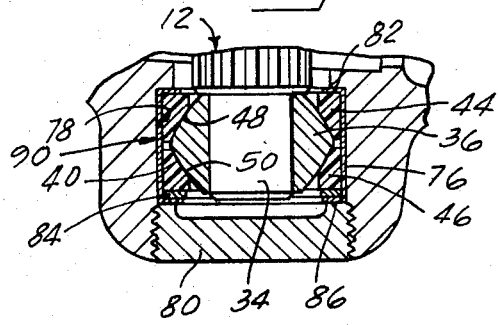
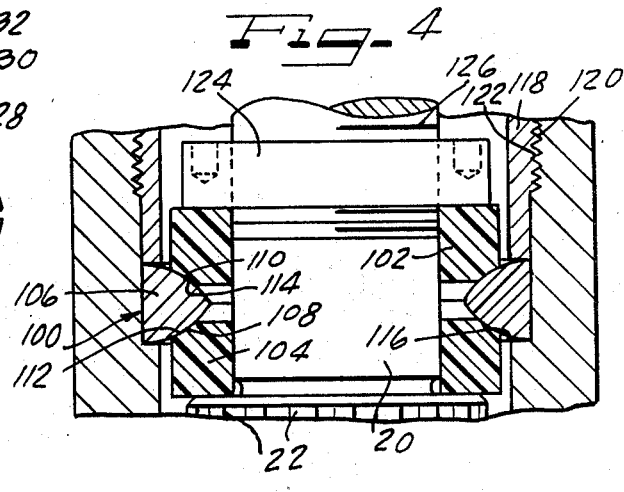
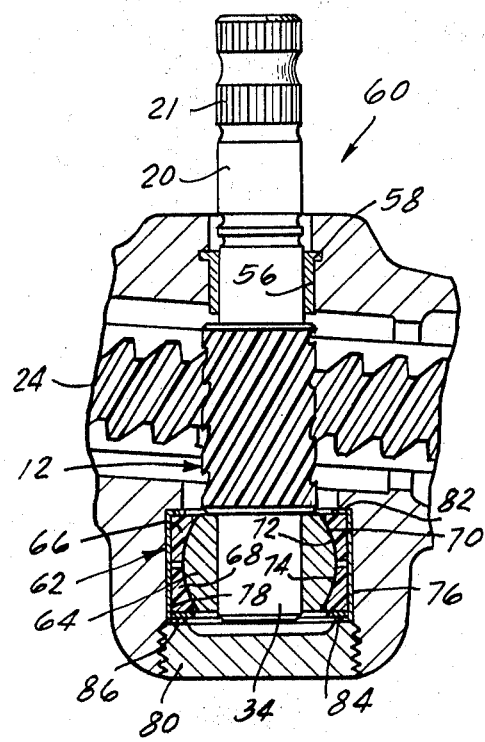
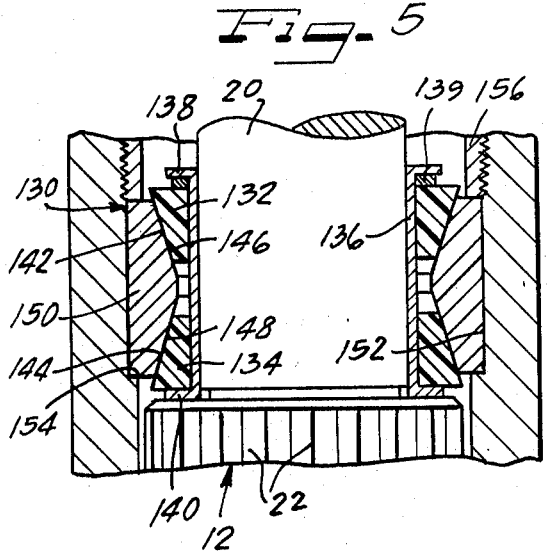

RACK AND PINION ASSEMBLIES

BACKGROUND OF THE INVENTION

1. Field of the Invention

This invention relates to rack and pinion assemblies, and is more particularly concerned with a rack and pinion assembly of the type wherein the pinion member is rotatably mounted in a housing member and meshes in engagement, within the housing member, with the rack of a rack bar so that on rotation of the pinion member the rack bar moves longitudinally through the housing member.

2. Description of the Prior Art

In a rack and pinion assembly of the type mentioned above, it is desirable that the pinion member be located and retained in a predetermined position with respect to the housing member, particularly so that it is restrained from movement in its axial direction, and preferably so that it is also restrained from movement in its axial direction. Radial restraint is desirable to reduce backlash in the pinion member upon reversal of the direction of longitudinal movement of the rack bar. In conventional rack and pinion constructions, the pinion member is usually rotatably mounted in a rolling bearing assembly carried between the pinion member and the housing member. Such a rolling bearing assembly may be designed and mounted to restrain both radial and axial movement of the pinion member, however, this technique is recognized to be expensive.

SUMMARY OF THE INVENTION

A primary object of the present invention is, therefore, to provide a rack and pinion assembly having a bearing assembly which restrains the pinion member from radial and axial displacement relative to the housing member, and to provide such a bearing assembly which may be relatively inexpensively manufactured and incorporated in a rack and pinion assembly.

According to the present invention, a rack and pinion assembly of the aforementioned type is provided which includes a bearing assembly that is provided for rotatably mounting the pinion member in the housing member. The bearing assembly comprises three generally annular bearing elements which substantially encircle the pinion member. A first of these bearing elements is carried either by the pinion member or the housing member and the second and third of these elements are carried in axially disposed array by the other of these members. The first bearing element has a first bearing surface which engages axially between and slidably abuts substantially complementary second and third bearing surfaces of the second and third elements, respectively. The area of abutment between the respective surfaces extends both radially and axially so that the abutment of these elements restrains displacement of the first bearing element, and thus the pinion member, both radially and axially with respect to the second and third bearing elements.

Preferably, the first bearing element is carried by the pinion member to rotate therewith and the other two bearing elements are carried by the housing member to be stationary relative thereto, although it is possible to provide a reverse arrangement in which the first bearing element is non-rotatably mounted and carried by the housing member and the second and third bearing elements are carried by the pinion member to rotate therewith.

Since the first bearing element is intended to rotate relative to the other two bearing elements so that the respective abutting surfaces slide over each other, the first bearing element is preferably made of metal and the other two elements are preferably made of a plastic material conveniently containing, or coated with, some form of low friction additive or material, such as polytetrafluroethylene or molybdenum disulphide. Alternatively, the other two elements may be made from a high grade polyethylene. It should be realized, however, that many materials for the bearing elements can be selected to provide required frictional and load bearing characteristics for the bearing assembly.

By axially and radially securing the first bearing element to one of the pinion or housing members and the other two bearing elements to the other of these members, and with the respective bearing surfaces in abutment, it will be readily apparent that the pinion member will be restrained against both radial and axial displacement relative to the housing member. In order to achieve the aforementioned arrangement in which the first bearing surface both axially and radially overlies each of the second and third bearing surfaces, the first bearing surface is preferably of convex shape, while the other two bearing surfaces are appropriately shaped to mate therewith. In a preferred arrangement, all three bearing surfaces are part spherical and are co-axial with the axis of the pinion. With such part spherical bearing surfaces, the first bearing surface may be provided with two discrete axially disposed bearing surface parts, which bearing surface parts are part spherical and are arranged so that the first bearing surface is of a generally "Gothic arch" shape in radial section. In a further arrangement, the second and third bearing surface parts may be frusto-conical and co-axial with the axis of the pinion member, while the convex bearing surface of the first bearing element provides two frusto-conical bearing surface parts which are substantially complementary to and slidably engage the respective second and third bearing surfaces.

With the bearing assembly mounted between the pinion member and the housing member, an axially adjustable component, such as a screw threaded cap or nut, may be provided on the pinion member or the housing member which carries the second and third bearing elements, so that axial adjustment of the component effects an adjustment in the relative axial spacing between the second and third bearing elements to pre-load the bearing assembly.

Although the components of the bearing assembly may be incorporated in the rack and pinion assembly on a piecemeal basis, in a further embodiment of the present invention the bearing assembly is mounted between the pinion and housing members as a pre-formed package. In such a package the three bearing elements are retained in appropriate operational engagement with each other by a tubular retaining part which locates and retains the second and third bearing elements in a predetermined axial relationship relative to each other and in sliding engagement with the first bearing element. By such an arrangement, a pre-packed bearing assembly can be formed which has a predetermined pre-load condition and is easily mounted on the pinion member between such member and the housing member, while in such a pre-loaded condition. In a construction in which the first bearing element is to rotate with the pinion member, the second and third bearing elements may be mounted in, and in engagement with, the tubular retaining member (the latter being appropriately deformed to locate the second and third bearing elements at a predetermined axial spacing and in sliding engagement with the first bearing element) and the tubular retaining member may be then mounted in an appropriate recess in the housing member, so that the first bearing element receives and engages with the pinion member to rotate therewith. In an alternative construction in which the second and third bearing elements are intended to rotate with the pinion member, these two elements may be mounted on and in engagement with the tubular member (which tubular member is appropriately deformed to locate the second and third bearing elements at a predetermined axial spacing and in sliding engagement with the first bearing element) and the tubular retaining member may be then mounted on the pinion member, so that the retaining member and the second and third bearing elements rotate with the pinion member while the first bearing element is held stationary in an appropriate recess in the housing member.

The aforementioned facility of having a pre-assembled package for the bearing assembly not only provides the advantage whereby the bearing can be pre-loaded to a desired condition, but also provides the advantage of not having to rely on the skill of an operator to provide a required degree of adjustment in the bearing during assembly of the rack and pinion assembly.

BRIEF DESCRIPTION OF THE DRAWING

Other objects, features and advantages of the invention, its organization, construction and operation will be best understood from the following detailed description of certain embodiments of the invention, taken in conjunction with the accompanying drawing, on which:

FIG. 1 illustrates an embodiment of a rack and pinion assembly, in partial section, in which the bearing assembly has the capability of being adjustably pre-loaded;

FIG. 2 illustrates, in a partial sectional view, a further embodiment of a rack and pinion assembly having a pre-package bearing assembly which provides a predetermined pre-load condition for rotatably mounting the pinion member;

FIG. 3 illustrates, in a partial sectional view, a part of a rack and pinion assembly, specifically showing a modified form of a pre-packed bearing assembly;

FIG. 4 illustrates, in a partial sectional view, part of a rack and pinion assembly and specifically shows a further form of bearing assembly in which the bearing elements are substantially in the reverse arrangement to those illustrated in FIG. 1; and FIG. 5 illustrates, again in a partial sectional view, part of a rack and pinion assembly, specifically showing a still further form of a pre-packed bearing assembly in which the bearing elements are substantially in the reverse arrangement to those illustrated in FIG. 3.

DESCRIPTION OF THE PREFERRED EMBODIMENTS

Where possible throughout the following description, the same parts or members in each of the figures have been given the same reference characters.

Referring to FIG. 1, a bearing assembly 10 is illustrated as comprising a pinion member 12 which is rotatably mounted in a housing member 14 by a bearing assembly 16 and a bearing 18 axially spaced therefrom. The rack and pinion assembly shown is particularly intended for use in a vehicle steering gear and for this purpose a cylindrical shaft 20 of the pinion member extends through the housing member 14 and is axially splined at 21 to be coupled to a steering wheel or like component.

The pinion member 12 includes teeth 22 which mesh in engagement in a known manner with the teeth of a rack bar 24 which is slidable longitudinally through the housing member 14. The rack bar 24 is biased into engagement with the pinion member by a spring-loaded yoke 26 which is slidably mounted in a bore 28 of the housing member and retained therein by a plate 30. A spring 32 bears against the yoke 26 and the plate 30 to provide the bias for the rack bar 24.

The bearing 18 is a conventional bronze or plastic bushing which rotatably mounts an end portion 34 of the shaft 20 which extends from the pinion member 12 on the side of the pinion teeth 22. The bushing 18 provides only radial support for the shaft end portion 34. The bearing assembly 16 incorporates the essence of the present invention and serves to radially locate the pinion member in the housing member and, depending upon its construction, may also provide thrust support for locating the pinion member axially in the housing member.

In FIG. 1 the bearing assembly 16 is illustrated as comprising a steel annular bearing element 36 which is secured by shrinkage, keying, or as a press fit on the shaft 20 for rotation therewith. The bearing element 36 has a convex outer bearing surface which is formed by two discrete bearing surface parts 38 and 40, each of which is part spherical and co-axial with the axis of the pinion member 12. By virtue of the part spherical bearing surface parts 38 and 40, the convex bearing surface of the element 36 presents a profile which, in radial section, may be likened to a "Gothic arch". A pair of further annular bearing elements 44 and 46 are mounted in a counterbore 42 of the housing member 14. The annular bearing elements 44 and 46 have concave part spherical inner bearing surfaces 48 and 50, respectively. The bearing elements 44 and 46 are axially spaced and their respective bearing surfaces 48 and 50 are complementary to the part spherical bearing surface parts 38 and 40 with which they respectively abut and slidably engage.

The bearing elements 44 and 46 are retained in the counterbore 42 by a plug 52 which is adjustable by virtue of its thread 54 which engage threads 56 of the housing member 14, and additionally serves to adjust the actual spacing between the bearing elements 44 and 46 and thereby the pre-load applied through the slidably engaging bearing surfaces.

The bearing elements 44 and 46 are intended to be stationary relative to the housing member 14 so that the inner bearing element 36 rotates within the two outer bearing elements and, since the inner bearing surfaces 48 and 50 both axially and radially overlie the outer bearing surface parts 38 and 40, respectively, the bearing element 36 and thus the pinion member 12 are restrained from both radial and axial movement relative to the housing member 14. The bearing elements 44 and 46 are conveniently made of a plastic material, and may include, or have their bearing surfaces coated with, a low friction material, such as polytetrafluroethylene or molybdenum disulphide. If required, the outer bearing elements 44 and 46 may be keyed to the housing member 14.

Referring to FIG. 2, a rack and pinion assembly 60 is illustrated in which the bearing assembly and the bearing are reversed in comparison with that shown in FIG. 1. In FIG. 2, a bearing 58 is mounted in a bore 56 in the housing member to rotatably receive the shaft 20. The pinion shaft end portion 34 is mounted in a bearing assembly 62 in this construction which is similar to the bearing assembly 3 of FIG. 1. The bearing assembly 62 comprises three bearing elements 64, 66 and 68 which are similar to the elements of the bearing assembly in FIG. 1, except that the convex outer bearing surface of the element 64 is wholly part spherical as shown at 70, while the inner bearing surfaces 72 and 74 abut and slidably engage therewith in a manner similar to that illustrated in FIG. 1.

The primary feature of the apparatus illustrated in FIG. 2 resides in the fact that the bearing assembly 62 is pre-packed prior to its location in the rack and pinion assembly. For this purpose, the three bearing elements 64, 66 and 68 are mounted within a tubular steel shell 76 which is non-rotatably seated in a counterbore 78 in the housing member and is retained therein by a screw plug 80. To pre-assemble the bearing assembly 62, the shell 76 is formed initially with a radially inwardly extending flange 82 against which the outer bearing elements 66 and 68 are retained to locate the inner bearing element 64. A washer 84 is located on the end of the element 68 and the shell 76 is then spun over to provide a further radially inwardly extending flange 86 to retain the three bearing elements in a predetermined pre-load condition. The packaged bearing assembly thus formed is then press fitted onto the shaft end 34 and into a counterbore 78 in the housing member and retained therein by the plug 80 which abuts against the flange 86 of the shell 76. Through pre-assembly of the bearing assembly 62, this bearing having a predetermined pre-load can be fitted into the rack and pinion assembly 60 by a relatively unskilled operator to provide a required degree of both radial and axial pre-load.

In FIG. 3, a bearing assembly 90 is illustrated which is similar to that illustrated in FIG. 2, with the exception that the tubular shell 76 accommodates the annular bearing elements 36, 44 and 46, respectively, which have part spherical bearing surfaces 40, 48, 50 in a similar manner to the embodiment of FIG. 1. Further detailed discussion of this bearing assembly is, therefore, unnecessary.

In FIG. 4, a bearing assembly 100 is illustrated which is reverse to the arrangement for the bearing assembly 3 of FIG. 1. In the bearing assembly 100, two annular bearing elements 102 and 104 are mounted on and rotate with the shaft 20 and the third bearing element 106 is secured relative to the housing member. The bearing element 106 has a convex part spherical bearing surface parts 108 and 110 to provide an inner bearing surface of Gothic arch profile in radial section, and these inner bearing surface parts respectively slidably engage with the concave substantially complementary outer part spherical bearing surfaces 112 and 114 of the bearing elements 102 and 104. The bearing element 106 is secured in the housing member against a shoulder 116 of that member by a screw threaded plug 118 having threads 120 to engage complementary threads 122 of the housing member. The bearing elements 102 and 104 are retained on the shaft 20 against a shoulder formed by the pinion teeth 22 by an adjustable nut 124 which engages threads 126 on the shaft 20. An appropriate adjustment of the nut 124 causes the bearing assembly 100 to be adjusted into a predetermined pre-load condition. In the modification illustrated in FIG. 5, a bearing assembly 130 is similarly oriented to that shown in FIG. 4 so that a pair of inner bearing elements 132 and 134 rotate with the pinion member 12 while the outer bearing element 150 is secured relative to the housing member. However, in FIG. 5 the bearing assembly 130 is pre-packed prior to being mounted on the shaft 20. For this purpose, the inner bearing elements 132 and 134 are retained on the outer surface of a tubular member 136 between radially outwardly extending flanges 138 (and a washer 139) and 140 thereof with the outer bearing surfaces 142 and 144 slidably engaging the inner bearing surface parts 146 and 148, respectively, of the bearing element 150. The bearing assembly 130 is mounted in the rack and pinion assembly by press fitting the tubular member 136 on the shaft 20 in a counterbore 152, in a manner similar to that illustrated in FIG. 2, while the bearing assembly is in a predetermined pre-load condition. The outer bearing element 150 is non-rotatably retained in the counterbore 152 against a shoulder 154 of the housing member by a plug 156.

It will be noted that the outer bearing surfaces 142 and 144 are frusto-conically shaped to abut and slidably engage substantially complementary frusto-conical inner bearing surface parts 146 and 148, respectively, on the bearing element 150.

By providing a wholly part spherical convex bearing surface 70 for the bearing element 64 in the apparatus of FIG. 2, it will be apparent that this bearing surface will be truly self-aligning with the bearing surfaces 72 and 74 to accommodate, within reasonable tolerances, errors and discrepancies which occur during manufacture of the bearing components. A similar advantage should be obtained by the use of the "Gothic arch" type bearing surface illustrated in FIGS. 1, 3 and 4.

It is preferred that the bearing surfaces of the bearing elements be part spherical rather than frusto-conical in shape, as illustrated in FIG. 5. The reason for this is the difficulty in obtaining true parallelity for the mating of the angled frusto-conical bearing surfaces; if the mating opposed frusto-conical surfaces are not parallel then sliding engagement between the opposed surfaces occurs at one or the other end of the frusto-conical faces with the result that an uneven loading and a localized high rate of wear is caused in the bearing assembly.

If the required part spherical concave bearing surfaces of the appropriate bearing elements, such as are incorporated in the apparatus of FIGS. 1 to 4, may be formed with a slightly larger radius of curvature than the part spherical convex bearing surfaces of the respective mating bearing elements, such a relationship will initially provide a line, or relatively small band area of contact, between the mating bearing surfaces. However, the final adjustment of the bearing assembly (or in the case of a preassembled bearing assembly, the established degree of pre-load) would, due to the plasticity of the material for either or both of the mating bearing elements, take up the slight difference in radii and produce a larger and more uniform area of contact with better bearing properties.

Although we have described our invention by reference to particular illustrative embodiments thereof, many changes and modifications of our invention may become apparent to those skilled in the art without departing from the spirit and scope of our invention. We therefore intend to include within the patent warranted hereon, all such changes and modifications as may reasonably and properly be included within the scope of our contribution to the art.

We claim:

1. A rack and pinion assembly, comprising:
   housing means;
   pinion means rotatably mounted in said housing means and including a shaft adapted to receive rotational forces, and a pinion carried on said shaft for rotation therewith;
   a rack extending through said housing means transversely of the axis of rotation of said pinion, said rack meshed with said pinion and mounted for longitudinal movement in response to rotation of said pinion; and
   bearing means mounting said pinion means in said housing means to resist radial and axial movement of said pinion, said bearing means including a ring-shaped first bearing element having a convex bearing surface which is at least part spherical, and ring-shaped second and third bearing elements each having a concave bearing surface which is at least part spherical and with the other concave surface is complemental to said convex bearing surface, said bearing elements co-axially oriented so that said convex bearing surface is received in sliding engagement with said concave bearing surfaces, said first bearing element secured to and carried by one of said housing and pinion means and said second and third bearing elements secured to and carried by the other of said housing and pinion means.

2. A rack and pinion assembly according to claim 1, wherein said first bearing element is mounted on and carried by said shaft for rotation therewith.

3. A rack and pinion assembly according to claim 1, wherein said first bearing element is fixedly mounted in said housing means.

4. A rack and pinion assembly according to claim 1, wherein said first bearing element is metal, and said second and third bearing elements include plastic material.

5. A rack and pinion assembly according to claim 4, wherein said plastic material is a material selected from the group consisting of polytetrafluroethylene, molybdenum disulphide and polyethylene.

6. A rack and pinion assembly according to claim 1, wherein said first bearing element is metal, and said second and third bearing elements include a layer of plastic material on said concave surfaces.

7. A rack and pinion assembly according to claim 1, wherein said first bearing element includes a Gothic arch cross section defining said convex surface.

8. A rack and pinion assembly according to claim 1, wherein said convex surface of said first bearing element is a totally spherical arcuate surface.

9. A rack and pinion assembly according to claim 1, comprising means in said housing means loading said bearing means.

10. A rack and pinion assembly according to claim 9, wherein said housing means includes a threaded bore receiving said pinion means and said bearing means and having a shoulder abutting said bearing means, and said means loading said bearing means includes a threaded member engaging the thread of said bore and adjustable to contact and force said bearing means against said shoulder.

11. A rack and pinion assembly according to claim 10, wherein said second bearing element abuts said shoulder and said third bearing element is contacted by said threaded member.

12. A rack and pinion assembly according to claim 9, wherein said shaft includes a threaded portion adjacent said pinion, said second and third bearing elements mounted on said shaft, one of said second and third elements abutting said pinion, and wherein said means loading said bearing includes a threaded member engaging the threaded portion of said shaft to contact the other of said second and third bearing elements and adjustable along said shaft to compress said second and third bearing elements.

13. A rack and pinion assembly according to claim 12, wherein said housing means includes a threaded bore receiving said pinion means and said bearing means and having a shoulder supporting said first bearing element, a second threaded member engaging the threaded bore contacting and securing said first bearing element against said shoulder in said housing means.

14. A rack and pinion assembly according to claim 1, wherein said bearing means is pre-loaded and comprises a sleeve coaxial with said second and third bearing elements, a first flange on one end of said sleeve supporting said second bearing element, a washer at the other end of said sleeve contacting said third bearing element for receiving a loading force, and a second flange on said other end of said sleeve sandwiching said washer between said second flange and said third bearing element and maintaining the loading force on said washer and said second and third bearing elements.

15. A rack and pinion assembly according to claim 14, wherein said sleeve surrounds said second and third bearing elements and said flanges are radially inturned flanges.

16. A rack and pinion assembly according to claim 14, wherein said second and third ring-shaped bearing elements surround said sleeve and said flanges extend radially outwardly.

17. A rack and pinion assembly according to claim 1, wherein said bearing means is a first bearing means, and further comprising a second bearing means carried by said housing means for rotatably mounting said shaft.

18. A rack and pinion assembly according to claim 17, wherein said second bearing means rotatably mounts one end of said shaft and said first bearing means rotatably mounts said shaft intermediate said second bearing means and the other end of said shaft.

19. A rack and pinion assembly according to claim 17, wherein said first bearing means rotatably mounts one end of said shaft and said second bearing means rotatably mounts said shaft intermediate said first bearing means and the other end of said shaft.

20. A pre-loaded, pre-packed bearing assembly for resisting radial and axial displacement of a shaft relative a housing receiving the shaft and the bearing assembly, comprising:
a ring-shaped first bearing element having a convex bearing surface;
ring-shaped second and third bearing elements having respective concave bearing surfaces which together are complemental to said convex bearing surface, said bearing elements arranged in co-axial relationship with said concave bearing surfaces receiving said convex bearing surface in sliding engagement;
a washer disposed against said second bearing element;
a sleeve co-axial with said bearing elements, said sleeve including a first radially extending flange abutting said third bearing element, said washer receiving a loading force, and a second radially extending flange overlying said washer to maintain the loading force on said bearing assembly.

21. A pre-loaded, pre-packed bearing assembly according to claim 20, wherein said sleeve is disposed about said bearing elements and said flanges are inturned flanges.

22. A pre-loaded, pre-packed bearing assembly according to claim 20, wherein said sleeve is disposed within said ring-shaped bearing elements and said flanges extend outwardly.

23. A pre-loaded, pre-packed bearing assembly according to claim 20, wherein said first bearing element is a metal element, and said second and third bearing elements each include plastic material.

24. A pre-loaded, pre-packed bearing assembly according to claim 20, wherein said first bearing element is a metal element, and said second and third bearing elements each carry a layer of low friction material.

25. A pre-loaded, pre-packed bearing assembly according to claim 24, wherein said low friction material includes a material selected from the group consisting of polytetrafluroethylene, molybdenum disulphide and polyethylene.

26. A rack and pinion assembly, comprising:
housing means including a first bore, a threaded counter-bore for said first bore defining a shoulder, a threaded member for engaging said threaded counterbore and adjustable therealong, and a second bore extending transversely of said housing means with respect to said first bore;
pinion means rotatably mounted in said first bore and including a shaft adapted to receive rotational forces, and a pinion carried on said shaft for rotation therewith;
a bushing mounted in said housing co-axial with respect to said first bore and rotatably mounting said shaft;
a rack extending through said second bore and disposed in meshed engagement with said pinion;
biasing means mounted in said housing urging said rack toward said pinion; and
a bearing assembly for preventing radial and axial displacement of said pinion means, said bearing assembly including at least one ring-shaped bearing element mounted on said shaft for rotation therewith, and a pair of ring-shaped bearing elements mounted in said counterbore and clamped against said shoulder by said threaded member, said ring-shaped bearing elements including complementary shaped slidably engaging bearing surfaces each of which have portions which extend in both the axial direction and the radial direction,
said ring-shaped bearing element mounted on said shaft having a radial cross section partially defined by at least a part spherical bearing surface, and said pair of ring-shaped bearing elements mounted in said counterbore each having part spherical shaped bearing surfaces for sliding engagement with the bearing surface of the bearing element carried by said shaft.

27. A rack and pinion assembly, comprising:
housing means including a first bore, a threaded counterbore for said first bore defining a shoulder, a threaded member for engaging said threaded counterbore and adjustable therealong, and a second bore extending transversely of said housing means with respect to said first bore;
pinion means rotatably mounted in said first bore and including a shaft adapted to receive rotational forces, and a pinion carried on said shaft for rotation therewith;
a bushing mounted in said housing co-axial with respect to said first bore and rotatably mounting said shaft;
a rack extending through said counterbore and disposed in meshed engagement with said pinion;
biasing means mounted in said housing urging said rack toward said pinion; and
a bearing assembly for preventing radial and axial displacement of said pinion means, said bearing assembly including at least one ring-shaped bearing element mounted on said shaft for rotation therewith, and a pair of ring-shaped bearing elements mounted in said counterbore and clamped against said shoulder by said threaded member, said ring-shaped bearing elements including complementary shaped slidably engaging bearing surfaces each of which have portions which extend in both the axial direction and the radial direction,
said ring-shaped bearing element mounted on said shaft having a radial cross section partially defined by a spherically arcuate bearing surface, and said pair of ring shaped bearing elements each having spherically shaped bearing surfaces for sliding engagement with the bearing surface of the bearing element carried by said shaft.

28. A rack and pinion assembly, comprising:
housing means including a first bore, a threaded counterbore for said first bore defining a shoulder, a threaded member for engaging said threaded counterbore and adjustable therealong, and a second bore extending transversely of said housing means with respect to said first bore;
pinion means rotatably mounted in said first bore and including a shaft adapted to receive rotational forces, and a pinion carried on said shaft for rotation therewith;
a bushing mounted in said housing co-axial with respect to said first bore and rotatably mounting said shaft;

a rack extending through said second bore and disposed in meshed engagement with said pinion;
biasing means mounted in said housing urging said rack toward said pinion; and
a bearing assembly for preventing radial and axial displacement of said pinion means, said bearing assembly including a pair of ring-shaped bearing elements mounted on said shaft for rotation therewith, and at least one ring-shaped bearing element mounted in said counterbore and clamped against said shoulder by said threaded member, said ring-shaped bearing elements including complementary shaped slidably engaging bearing surfaces each of which have portions which extend in both the axial direction and the radial direction,
said ring-shaped bearing element mounted in said counterbore having a radial cross section wherein said bearing surface is in the shape of a Gothic arch, and said pair of ring-shaped bearing elements mounted on said shaft each having a part spherical shaped bearing surface which together with the other like bearing surface is complementary to and in sliding engagement with said Gothic arch bearing surface of said bearing element mounted in said counterbore.

29. A rack and pinion assembly, comprising:
housing means including a first bore, a threaded counterbore for said first bore defining a shoulder, a threaded member for engaging said threaded counterbore and adjustable therealong, and a second bore extending transversely of said housing means with respect to said first bore;
pinion means rotatably mounted in said first bore and including a shaft adapted to receive rotational forces, and a pinion carried on said shaft for rotation therewith;
a bushing mounted in said housing co-axial with respect to said first bore and rotatably mounting said shaft;
a rack extending through said second bore and disposed in meshed engagement with said pinion;
biasing means mounted in said housing urging said rack toward said pinion; and
a bearing assembly for preventing radial and axial displacement of said pinion means, said bearing assembly including a pair of ring-shaped bearing elements mounted on said shaft for rotation therewith, and at least one ring-shaped bearing element mounted in said counterbore and clamped against said shoulder by said threaded member, said ring-shaped bearing elements including complementary shaped slidably engaging bearing surfaces each of which have portions which extend in both the axial direction and the radial direction,
said ring-shaped bearing element mounted in said counterbore having a radial cross section partially defined by a spherically arcuate bearing surface, and said pair of ring-shaped bearing elements mounted on said shaft each having a spherically arcuate bearing surface complementary to the spherically arcuate bearing surface of said bearing element mounted in said counterbore and disposed in sliding engagement therewith.

* * * * *